US010517157B2

(12) United States Patent
Kinstle, III

(10) Patent No.: US 10,517,157 B2
(45) Date of Patent: Dec. 24, 2019

(54) CONTROL SYSTEM FOR CONTROLLING LEDS IN MULTIPLE LED COMPUTER FANS

(71) Applicant: Corsair Memory, Inc., Fremont, CA (US)

(72) Inventor: Robert Michael Kinstle, III, Fremont, CA (US)

(73) Assignee: Corsair Memory, Inc., Fremont, CA (US)

( * ) Notice: Subject to any disclaimer, the term of this patent is extended or adjusted under 35 U.S.C. 154(b) by 0 days.

(21) Appl. No.: 15/861,682

(22) Filed: Jan. 4, 2018

(65) Prior Publication Data

US 2018/0192493 A1 Jul. 5, 2018

Related U.S. Application Data

(60) Provisional application No. 62/442,414, filed on Jan. 4, 2017.

(51) Int. Cl.
*H05B 33/08* (2006.01)
*G06F 1/20* (2006.01)
*H05B 37/02* (2006.01)
*G06F 1/18* (2006.01)
*F04D 25/16* (2006.01)
*F04D 27/00* (2006.01)
*F21K 9/00* (2016.01)

(52) U.S. Cl.
CPC ....... *H05B 33/0863* (2013.01); *F04D 25/166* (2013.01); *F04D 27/004* (2013.01); *G06F 1/181* (2013.01); *G06F 1/182* (2013.01); *G06F 1/20* (2013.01); *H05B 33/086* (2013.01); *H05B 37/029* (2013.01); *F21K 9/00* (2013.01)

(58) Field of Classification Search
USPC ......................................................... 361/760
See application file for complete search history.

(56) References Cited

U.S. PATENT DOCUMENTS

2003/0136843 A1* 7/2003 Ralph ........................ A47F 9/04
                                                                      235/462.33
2016/0374161 A1* 12/2016 Kim .................... H05B 33/0815

* cited by examiner

*Primary Examiner* — Andargie M Aychillhum
(74) *Attorney, Agent, or Firm* — Carina Tan

(57) ABSTRACT

A data distributer device for controlling the lighting effects of a series of LEDs associated with a plurality of LED computer fans is disclosed. According to certain embodiments, the data distributer device comprises a printed circuit board, a plurality of LED fan data connectors on the printed circuit board, a controller data input connector on the printed circuit board and at least one power input connector on the printed circuit board. The plurality of LED fan data connectors is electrically arranged serially on the printed circuit board.

7 Claims, 5 Drawing Sheets

CONTROL SYSTEM FOR CONTROLLING LEDS IN MULTIPLE LED COMPUTER FANS

CROSS-REFERENCE TO RELATED APPLICATIONS

The present application claims the benefit of U.S. Provisional Patent Application Ser. No. 62/442,414, filed Jan. 4, 2017 and entitled "Control System for Controlling LEDs in Multiple LED Computer Fans," by Robert Michael Kinstle III, which is hereby incorporated by reference in its entirety.

TECHNICAL FIELD

The disclosed embodiments relate generally to computer fans. More particularly, the disclosed embodiments relate to methods, systems for controlling LEDs in multiple LED computer fans.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Figure 1:
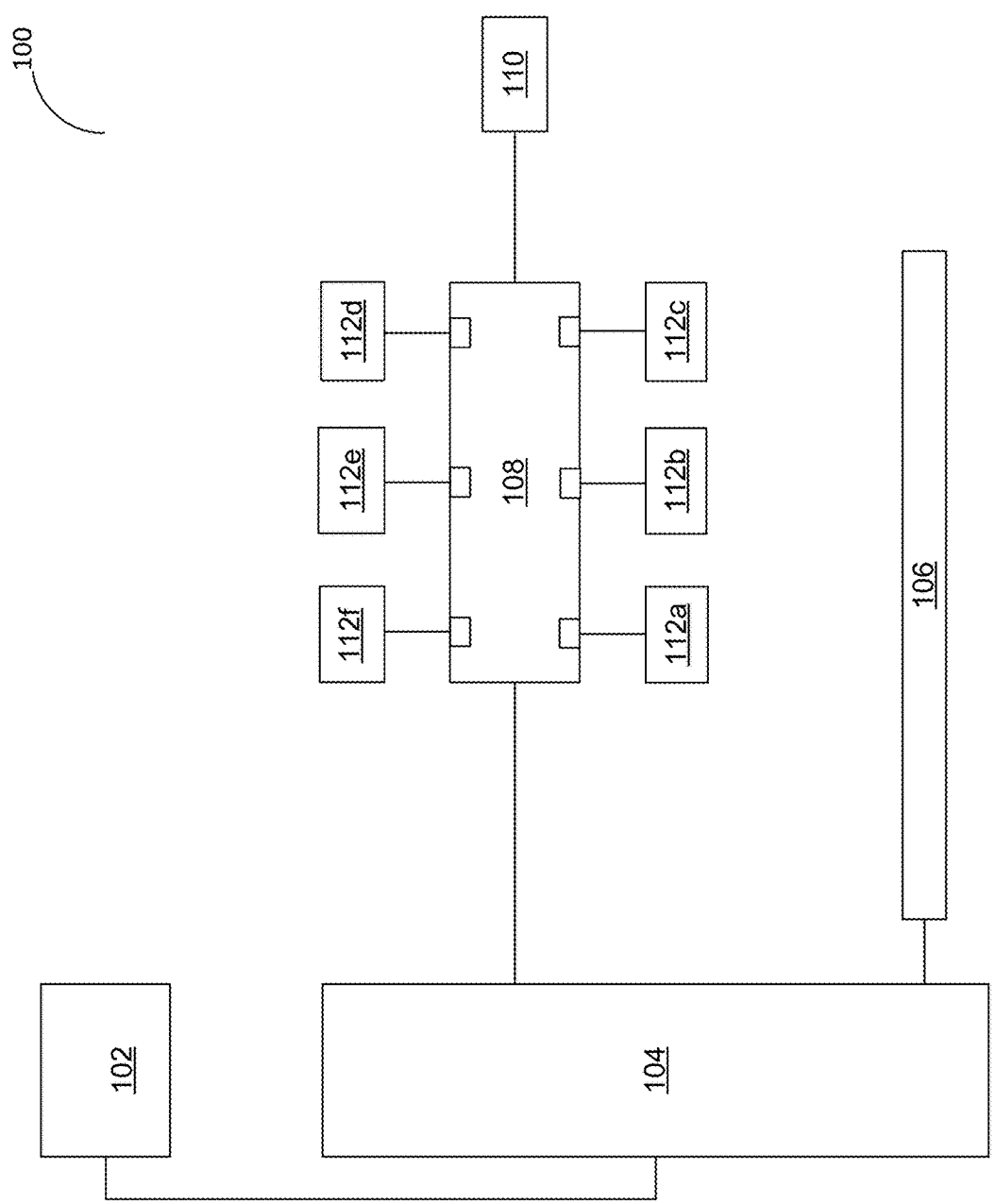
FIG. 1 is a high-level block diagram that illustrates the logic of a control system for controlling a series of LEDs associated with multiple LED computer fans, according to certain embodiments.

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 4:
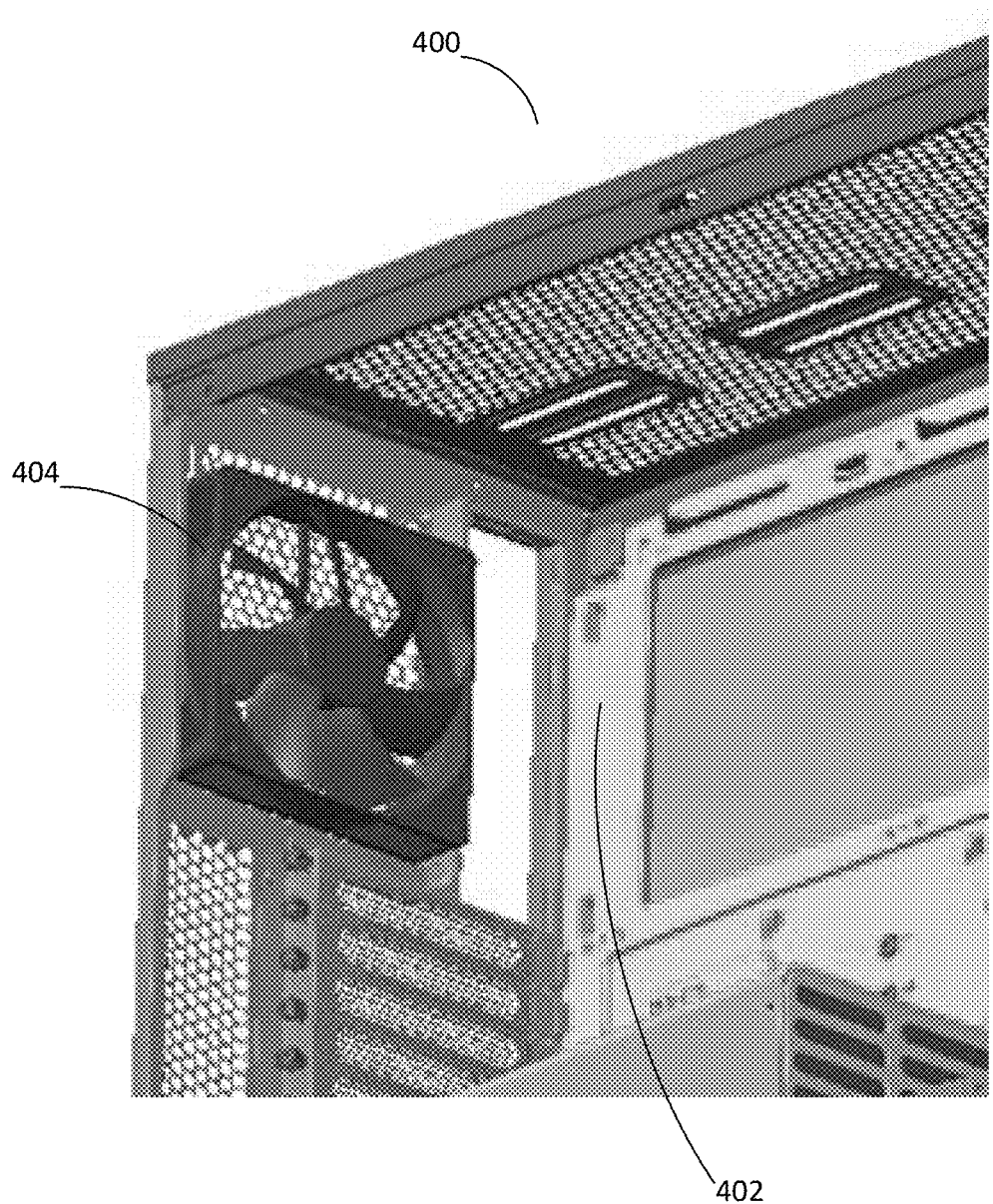
FIG. 4 is a high-level block diagram that illustrates a partial view of the interior of a computer chassis in which LED computer fans are installed, according to certain embodiments.

According to certain embodiments, multiple computer fans are installed in the chassis of a computer to cool the computer, as described herein with reference to FIG. 4. Such computer fans may include a number of LEDs that can be controlled to display various lighting effects. Such lighting effects can be particularly charming when portions of the computer chassis walls are made of a transparent or translucent material so that the lighting effects can be seen through the transparent/translucent portions of the chassis walls.

As a non-limiting example, the LEDs of the LED computer fans can be RGB LEDs or single colored LEDs. In the case of RGB LEDs, the RGB LEDs can be programmed to display various colors. Further, the LEDs (whether single colored or RGB) can be programmed (using a computer application program associated with the LED computer fans) to display various lighting patterns/effects by programming each of the LEDs to turn on and off at specific intervals as specified by the computer application program (hereinafter, "LED computer program"). Thus, an end-user can create various lighting effects using the LED computer program to program the LEDs of a plurality of LED computer fans such that the LEDs work together to create a "light show." As a non-limiting example, the timing and colors of the LEDs can be programmed to produce a multi-colored/or single colored animated "cork screw" lighting effect. As another non-limiting example, the LEDs can be programmed to produce a multi-colored/or single colored, animated "wave pattern" lighting effect. The type of light show would depend on the creativity of the end-user that is programming the LEDs using the LED computer program. According to certain embodiments, one or more lighting effects may be pre-programmed and saved as default programs for use by the end-user in the event that the end-user does not wish to program her/his own lighting effects for the LEDs.

According to certain embodiments, a plurality of LEDs is attached to each computer fan at various locations of the computer fan. As a non-limiting example, the plurality of LEDs can be attached to the perimeter of the frame that holds of the computer fan. As another non-limiting example, the LEDs can be attached to the hub area of the frame that holds of the computer fan as described herein with reference to FIG. 5.

According to certain embodiments, a control system for controlling a series of LEDs (electrically arranged in series on an electrical circuit) that are associated with a plurality of LED computer fans receives data from a single data source. Non-limiting examples of such a data source includes an LED computer program on a host computer that is associated with the control system. As another non-limiting example, the data source may be a pre-programmed memory device with push-button selectable programs. As another non-limiting example, the data source is a memory playback device that has stored program data for controlling the LEDs. As another non-limiting example, the data source is a microcontroller.

According to certain embodiments, an end-user uses the LED computer program to program each LED in the series of LEDs associated with the LED computer fans. For purposes of explanation, assume there are 6 LED computer fans under the control of the control system described herein. Further assume, that each fan has 12 LEDs. Thus, the total number LEDs in the series of LEDs that can be programmed is 72 LEDs. Thus, the end-user can use the LED computer program to send digital information to each of the 72 LEDs in the series to control the individual LEDs. To explain, each LED is individually addressable and thus can be individually and separately controlled. As a non-limiting example, the lighting effects of each of LED computer fan can be programmed to be synchronized with the other LED computer fans that are in the same control system. As another non-limiting example, the lighting effects of each of LED computer fan can be programmed to display a different lighting effect than that of the other LED computer fans that are in the same control system. As another non-limiting example, a particular lighting effect can be programmed to loop through each LED computer fan in succession. As another non-limiting example, the end-user may choose to program fewer than the complete number of LEDs in a given series of LEDs, according to certain embodiments. Continuing with the example above, the user may decide to program only 70 of the 72 LEDs in the series. In such an example, the first 70 LEDs in the series will receive digital information sent from the LED computer program, and the remaining 2 LEDs in the series will not receive any digital information from the LED computer program, according to certain embodiments. It may be that these remaining 2 LEDs in the series may already have stored digital information in its memory, wherein such digital information was previously received from the LED computer program during a previous programming cycle, according to certain embodiments. Further, if these remaining 2 LEDs in the series do not already have digital information stored in its memory, they will remain inactive until they receive digital information for controlling them.

The number of LED computer fans is not restricted to 6 and the number of LEDs in each LED computer fan is not restricted to 12. The number of LED computer fans and the number of LEDs in each LED computer fan may vary from implementation to implementation. Further, each LED computer fan of the plurality of LED computer fans in the control system is not required to have the same number of LEDs as any other LED computer fans in the control system. The number of LEDs in each LED computer fan is independent of the number of LEDs in any other LED computer fan in the control system, according to certain embodiments.

According to certain embodiments, as digital information arrives at a given LED in the series of LEDs from the data source (e.g., LED computer program at a host computer), the digital information is stored at the given LED. When the storage memory of the given LED is full, subsequent digital information arriving at the given LED is automatically forwarded to the next LED in the series of LEDs. The receipt and storage of digital information at each LED in the series of LEDs continues in the manner described above until all the LEDs in the series are programmed or until no more digital information arrives from the data source, according to certain embodiments.

According to certain embodiments, once the LEDs in the series have received and stored digital information from the LED computer program or other data source, the programmed LEDs light up simultaneously after a brief period of inactivity or upon receiving an execute command from a controller, according to certain embodiments.

FIG. 1 is a high-level block diagram that illustrates the logic of a control system for controlling a series of LEDs (LEDs are electrically arranged in series on an electrical circuit) associated with multiple LED computer fans, according to certain embodiments. FIG. 1 shows an LED control system 100 that includes a controller 104, a standalone string of LEDs 106 that is not attached to any LED computer fan, and a data distributer device 108, according to certain embodiments. Controller 104 receives digital data from a data source 102. Data source 102 can be an LED computer program on a host computer that is associated with the control system, or a memory playback device or a microcontroller, according to certain embodiments. Further data source 102 is connected to controller 104 via a USB connector, according to certain embodiments. According to other embodiments, data source 102 is connected to controller 104 via a data connector (e.g., pin data connector). The advantage of a USB connector or pin data connector is that controller 104 can connect to a different data source easily without rewiring. Alternatively, data source 102 is hard wired to controller 104.

Similarly, controller 104 is connected to the standalone string of LEDs 106 ("standalone LED string"), and data distributer device 108 via respective USB connectors or pin data connector. Thus, standalone LED string 106 can be replaced easily with another desired LED string. Likewise, data distributer device 108 can be replaced easily with another data distributer device, if so desired. Controller 104 is also connected to a power supply source (not shown in FIG. 1). According to certain embodiments, standalone LED string 106 is used to light up various parts of the computer chassis in which the LED computer fans are installed. For example, standalone LED string 106 can be used to light up the edges of the computer chassis.

According to certain embodiments, data distributer device 108 is connected to a set of LEDs corresponding to each LED computer fan of the plurality of LED computer fans (112a-f) via USB connectors. According to certain other embodiments, data distributer device 108 is connected to each LED computer fan through LED fan data connectors (e.g., pin data connectors). Thus, one or more sets of the LEDs corresponding to the LED computer fans can be easily replaced, if desired. Data distributer device 108 is also connected to a power supply source 110. According to certain embodiments, the data distributer device 108 maybe connected to multiple power supply sources. The LEDs associated with each LED computer fan together form a series of LEDs that can be programmed with digital information from data source 102. The flow of digital information from controller 104 through data distributer device 108 and the series of LEDs connected to data distributer device 108 is described in greater detail with reference to FIG. 2 and FIG. 3, herein.

Figure 2:
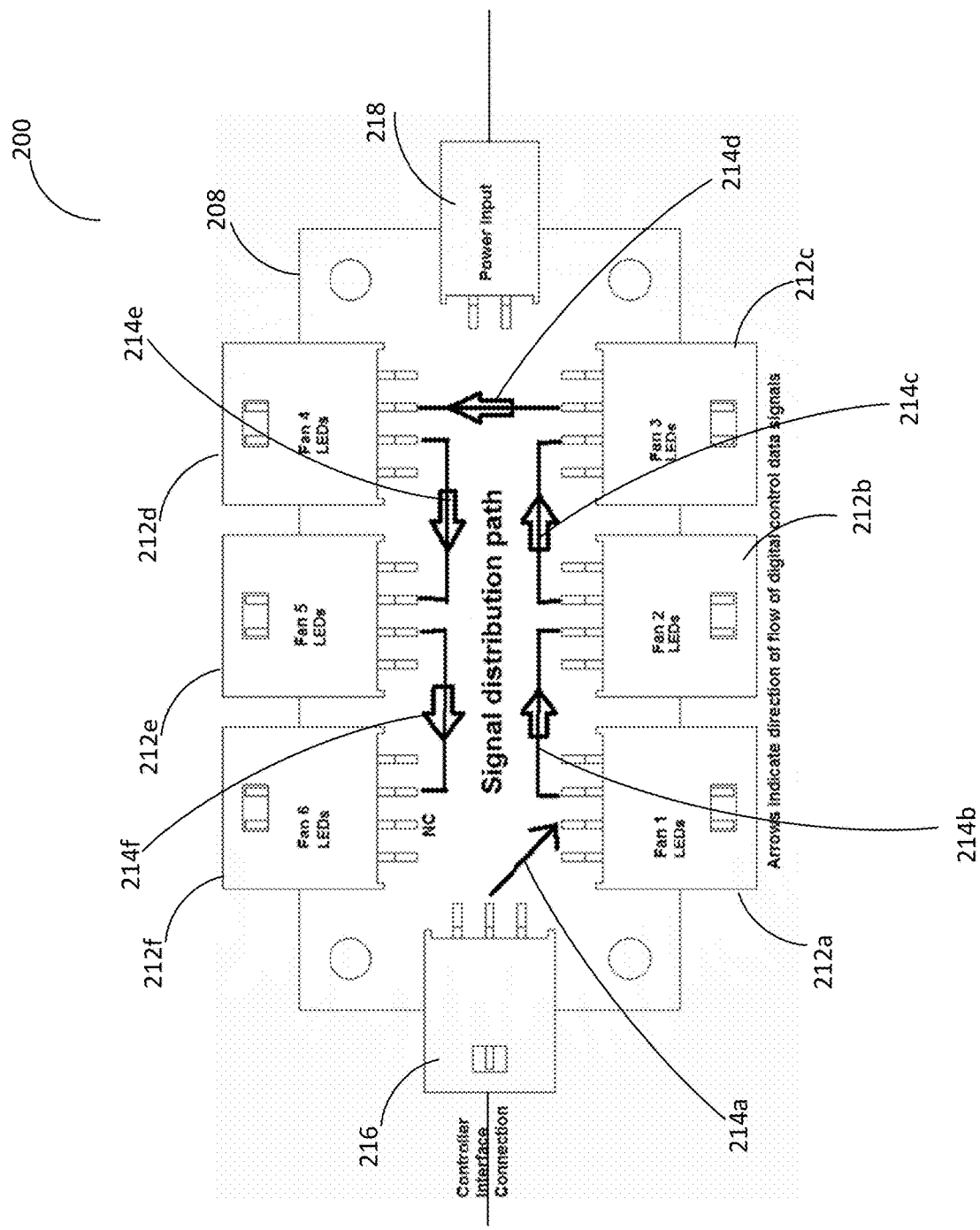
FIG. 2 is a high-level block diagram that illustrates the data flow logic of a data distributer device associated with controlling a series of LEDs associated with multiple LED computer fans, according to certain embodiments.

FIG. 2 is a high-level block diagram that illustrates the data flow logic of a data distributer device associated with controlling a series of LEDs associated with multiple LED computer fans, according to certain embodiments. FIG. 2 shows a data distribution path 200 in a data distributer device 208. According to certain embodiments, digital information is received at data distributer device 208 from an associated controller at the controller interface connection 216. The received digital information is passed (214a) to a first LED connector 212a that is associated with Fan 1. The received digital information is passed to the string of LEDs associated with Fan 1 ("first LED string"), and each LED in the first LED string is programmed. The manner in which the individual LEDs in a given LED string is described in greater detail with reference to FIG. 3, herein.

According to certain embodiments, once the LEDs in the first LED string are programmed, the digital information is passed (214*b*) to a second LED connector 212*b* that is associated with Fan 2. The received digital information is passed to the string of LEDs associated with Fan 2 ("second LED string"), and each LED in the second LED string is programmed.

According to certain embodiments, once the LEDs in the second LED string are programmed, the digital information is passed (214*c*) to a third LED connector 212*c* that is associated with Fan 3. The received digital information is passed to the string of LEDs associated with Fan 3 ("third LED string"), and each LED in the third LED string is programmed.

According to certain embodiments, once the LEDs in the third LED string are programmed, the digital information is passed (214*d*) to a fourth LED connector 212*d* that is associated with Fan 4. The received digital information is passed to the string of LEDs associated with Fan 4 ("fourth LED string"), and each LED in the fourth LED string is programmed.

According to certain embodiments, once the LEDs in the fourth LED string are programmed, the digital information is passed (214*e*) to a fifth LED connector 212*e* that is associated with Fan 5. The received digital information is passed to the string of LEDs associated with Fan 5 ("fifth LED string"), and each LED in the fifth LED string is programmed.

According to certain embodiments, once the LEDs in the fifth LED string are programmed, the digital information is passed (214*f*) to a sixth LED connector 212*f* that is associated with Fan 6. The received digital information is passed to the string of LEDs associated with Fan 6 ("sixth LED string"), and each LED in the sixth LED string is programmed.

The number of LED computer fans is not restricted to 6. The number of LED computer fans and the number of LEDs in each LED computer fan may vary from implementation to implementation. Depending on the power supply (through power input 218), data distributer device 208 can support more (or fewer) than 6 LED computer fans. Because the power source is independent of the power source of the controller, it is feasible to have a large number of LED computer fans controlled by the one controller. Furthermore, the LED computer fans can be located at a distance that is otherwise impractical for the LED computer fans to be powered by the power source of the controller.

Figure 3:
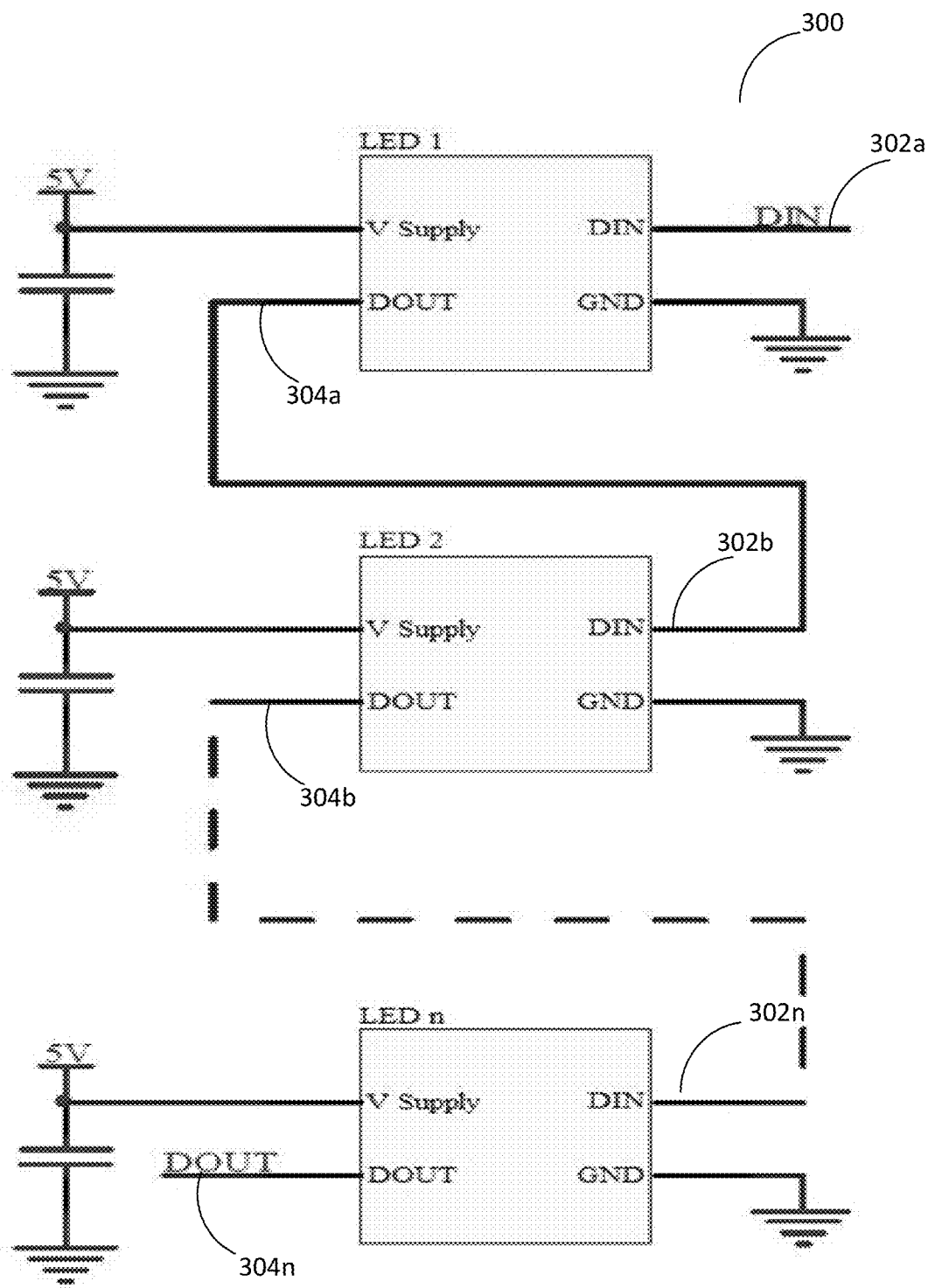
FIG. 3 is a high-level block diagram that illustrates the flow of data through a series of LEDs associated with the plurality of LED computer fans, according to certain embodiments.

FIG. 3 is a high-level block diagram that illustrates the flow of data through a series of LEDs associated with the plurality of LED computer fans, according to certain embodiments. For purposes of explanation, assume that a data distributer device (e.g., data distributer device 108 or data distributer device 208) distributes digital information from a data source to 6 LED computer fans. Further assume that each LED computer fan has a total of 12 LEDs. Thus, the total number LEDs in the series of LEDs that can be programmed is 72 LEDs ("LED Series"). The digital information includes digital control information for controlling the lighting effects of a respective LED in the LED Series. FIG. 3 shows data flow 300 through an LED Series associated with a control system for controlling a series of LEDs as described herein. According to certain embodiments, digital information from a data source (LED computer program or memory playback device, or microcontroller) is received by a controller in the control system for controlling a series of LEDs and sent to a data distributer device. Continuing with the example above, the data distributer device distributes the received digital information to the 72 LEDs in the LED Series. In other words, n=72. Digital information includes digital lighting information to control the lighting effects of the series of LEDs as described herein.

FIG. 3 shows a first digital input to LED 1 (DIN 302*a*). LED 1 stores the digital information in its receive-buffer. When a second digital input arrives at LED 1, because LED 1's receive-buffer already has digital information, the second digital input is automatically forwarded down the data bus as output (DOUT 304*a*) and sent as input (DIN 302*b*) to LED 2. LED 2 stores the digital information input in LED 2's receive-buffer. When a third digital input arrives at LED 1, the third digital input is automatically forwarded as output (DOUT 304*a*, 304*b*) and sent as input to LED 3, etc., because the respective receive-buffer corresponding to LED 1 and LED 2 already has digital information. When all the LEDs in a given fan is programmed in this manner, the digital information is retransmitted to the data distributer device and the data distributer device reroutes the digital information to the next LED computer fan connected to the data distributer device. Thus, each LED of the n number of LEDs in the LED Series is programmed in this manner. According to certain embodiments, once the last LED (LED n) in the LED Series has received and stored digital information from the LED computer program or other data source, the control system waits for a brief period of inactivity (e.g., 8 bus cycles), each of the programmed LEDs in the LED Series transfers the digital information from its respective receive-buffer to its corresponding execute-buffer. The embodiments are not restricted to 8 bus cycles. The number of bus cycles may vary from implementation to implementation. Once the digital information is transferred to respective execute-buffers, all the LEDs light up simultaneously or upon receiving an execute command from a controller, according to certain embodiments. If at a later time, an end-user wishes to re-program the LEDs in the LED Series, the now empty receive-buffers of each LED in the LED Series is ready to receive digital information from a new digital information stream for controlling the lighting effects of the LEDs in the LED Series.

FIG. 4 is a high-level block diagram that illustrates a partial view of the interior of a computer chassis in which LED computer fans are installed, according to certain embodiments. FIG. 4 shows an interior 402 of a computer chassis 400. FIG. 4 also shows one of the LED computer fans 404 installed in interior 402 of computer chassis 400. Computer chassis 400 has a plurality of LED computer fans installed in its interior 402 but only one LED computer fan is shown in FIG. 4.

Figure 5:
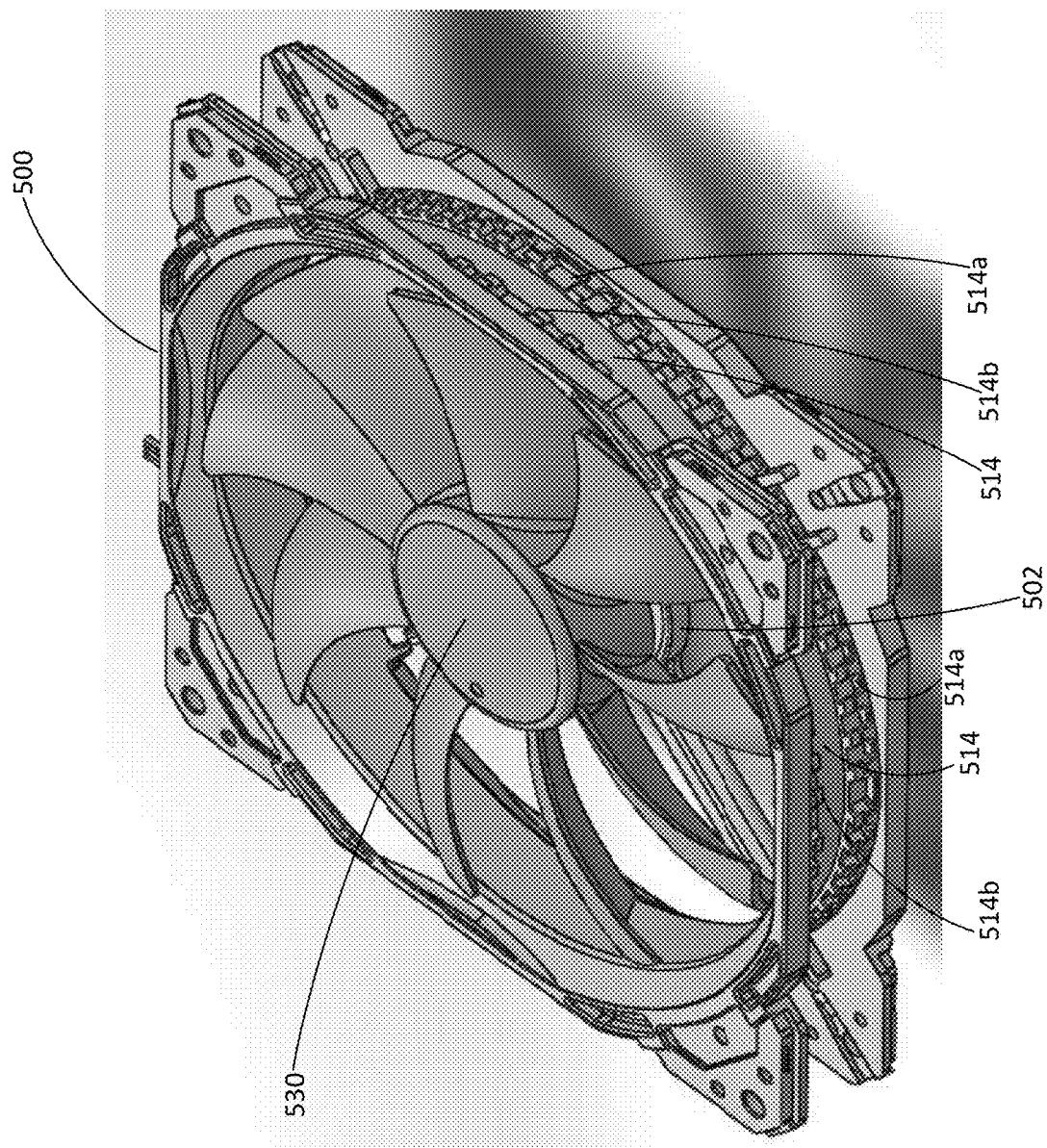
FIG. 5 is a high-level block diagram that illustrates an LED computer fan of the plurality of LED computer fans, according to certain embodiments.

FIG. 5 is a high-level block diagram that illustrates an LED computer fan of the plurality of LED computer fans, according to certain embodiments. FIG. 5 shows a fan frame 500. Fan frame 500 includes a hub area 502 that supports fan 530. Fan frame 500 includes a perimeter wall 514. According to certain embodiments, perimeter wall 514 includes an upper ribbed surface 514*b* and a lower ribbed surface 514*a*. According to certain embodiments, a string of LEDs can be attached to perimeter wall 514 between upper ribbed surface 514*b* and lower ribbed surface 514*a*. According to certain embodiments, an additional string of LEDs can be attached to hub area 502. According to certain embodiments, fan frame 500 and fan 530 are made of a transparent or translucent material such that the light from the LEDs can shine through fan frame 500 and fan 530.

According to certain embodiments, the data distributer device (e.g., data distributer device 108 or data distributer device 208) comprises a printed circuit board, a plurality of LED fan data connectors on the printed circuit board, a controller data input connector on the printed circuit board and at least one power input connector on the printed circuit board. The plurality of LED fan data connectors is electrically arranged serially on the printed circuit board. Each LED fan data connector includes at least one data input pin and at least one data output pin. A given LED computer fan can be connected to the data distributer via the LED fan data connector. According to certain embodiments, the controller data input connector is associated with a controller that controls the data distributer device.

According to certain embodiments, the at least one power input connector on the printed circuit board is for connecting to a power supply that is independent of the power supply of the controller that is controlling the data distributer device.

According to certain embodiments, the data distributor device may be powered by more than one power supply. According to certain embodiments, a plurality of data distributer devices may be connected serially to each other through one or more LED fan data connectors on the printed circuit board associated with each data distributer device.

According to certain embodiments, the controller data input connector receives digital input lighting information from the controller for controlling the lighting effects displayed by the series of LEDs associated with the plurality of LED computer fans.

According to certain embodiments, the controller receives digital input lighting information from a data source. The data source is any one of: 1) an LED computer program on a host computer that is associated with the control system, 2) a pre-programmed memory device with push-button selectable programs, 3) a memory playback device that has stored program data for controlling the LEDs, and 4) a microcontroller.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A data distributer device comprising: a printed circuit board; a plurality of LED fan data connectors electrically arranged serially on the printed circuit board, wherein an LED fan data connector of the plurality of LED fan data connectors includes one data input pin and one data output pin; a controller data input connector on the printed circuit board, the controller data input connector is associated with a controller that controls the data distributer device; and at least one power input connector on the printed circuit board, wherein the controller data input connector receives digital input lighting information from the controller for controlling lighting effects of a series of LEDs associated with corresponding LED computer fans.

2. The data distributer device of claim 1, wherein the at least one power input connector is associated with a first power supply that is independent of a second power supply that is associated with the controller.

3. The data distributer device of claim 1, wherein the controller receives digital input lighting information from a data source.

4. The data distributer device of claim 3, wherein the data source is any one of: 1) an LED computer program on a host computer that is associated with the controller, 2) a pre-programmed memory device with push-button selectable programs, 3) a memory playback device that has stored program data for controlling LEDs, and 4) a microcontroller.

5. The data distributer device of claim 3, wherein the data source is stored on the controller.

6. The data distributer device of claim 1, wherein at least one LED fan data connector of the plurality of LED fan data connectors is connected to an LED computer fan.

7. The data distributer device of claim 1, wherein at least one LED fan data connector of the plurality of LED fan data connectors is connected to another data distributer device.

\* \* \* \* \*